United States Patent [19]
Evans et al.

[11] 3,916,408
[45] Oct. 28, 1975

[54] RADAR RECEIVER HAVING CLUTTER AND LARGE SIGNAL REDUCTION

[75] Inventors: Norol T. Evans, San Pedro; Richard F. Hyneman, Fullerton, both of Calif.

[73] Assignee: Hughes Aircraft Company, Culver City, Calif.

[22] Filed: Jan. 18, 1974

[21] Appl. No.: 436,270

[52] U.S. Cl. ..... 343/100 LE; 343/18 E; 343/100 CL
[51] Int. Cl.² ............................................. G01S 3/06
[58] Field of Search ....... 343/100 LE, 100 CL, 18 E

[56] References Cited
UNITED STATES PATENTS

| | | | |
|---|---|---|---|
| 2,825,900 | 3/1958 | Collbohm | 343/100 LE |
| 2,938,206 | 5/1960 | Davis et al. | 343/100 LE X |
| 3,202,990 | 8/1965 | Howells | 343/100 LE |

*Primary Examiner*—Maynard R. Wilbur
*Assistant Examiner*—Richard E. Berger
*Attorney, Agent, or Firm*—W. H. MacAllister; Walter J. Adam

[57] ABSTRACT

An improved radar receiver including coherent side-lobe cancellation in which a difference pattern is utilized in azimuth by the auxiliary antenna to reduce the clutter return signal on the auxiliary channel and to also cause the clutter signal to be decorrelated with the clutter received on the main antenna. The two effects of reducing the clutter return and the decorrelation considerably reduces the degradation in coherent side-lobe cancellation operation of jamming signals characteristically caused by clutter on the auxiliary channel over most of the surveillance volume. Also, by providing substantial attenuation of the large target return in the auxiliary channel by the null in the direction of the principle response of the main antenna, large target signal returns are unable to capture the coherent side-lobe canceller loops and inhibit the coherent cancellation of jamming signals.

7 Claims, 5 Drawing Figures

RADAR RECEIVER HAVING CLUTTER AND LARGE SIGNAL REDUCTION

The invention herein described was made in the course of or under a Contract or Subcontract thereunder with the Department of the Navy.

BACKGROUND OF THE INVENTION
1. Field of the Invention

This invention relates to radar receivers that overcome the effect of interfering noise sources and jamming sources and particularly to a receiver that substantially reduces the effects of clutter and large signals on the performance of coherent side-lobe cancellers.

2. Description of the Prior Art

Coherent side-lobe cancellers (CSLC) are designed primarily to cancel continuous jamming such as noise jamming or CW (Continuous Wave) jamming. The principle disadvantages of conventional coherent side-lobe cancellers are that the clutter return on the auxiliary channel or channels limit the noise cancellation to this clutter level, and the large targets received by both main antenna and auxiliary antenna capture the canceller loops inhibiting the cancellation of jamming signals and causing unwanted noise transients after their occurrence. A large signal occuring in the main antenna beam normally will be correlated with the same signal appearing on the auxiliary CSLC channel when a conventional omni or low-gain antenna is used on the auxiliary channels. Because these signals are correlated, a large error signal will be developed in the cancellers and they will attempt to cancel the signal in the main beam channel. However, the signal in the main beam sum channel is at least 10 db larger than the sum of the same signals in the auxiliary channels so that the signal in the main beam sum channel cannot be cancelled because the gain of the CSLC channels is constrained. The total error signal in the CSLC channel sent to the cancellation point will always be several db smaller than a main beam sum signal. Thus, the large signals capture the CSLC filter loops during the large target occurrence intervals causing a substantial degradation of side-lobe jamming cancellation during this period. In addition, after the end of a large target occurrence, the filter loops will have to reacquire the jammers, thus causing an additional transient noise problem. Conventionally, CW pilot signals have been used in a control arrangement in the main lobe to reduce the large target capture effect by having the CSLC circuits respond to the pilot signal to minimize the variation of the error signal. This pilot signal arrangement is only effective at one target location in the main beam unless multiple pilot signals are used, which latter arrangement would be relatively complicated. A system that would substantially reduce the effect of clutter and large signals on the performance of coherent side-lobe cancellers would be highly useful in the radar art.

SUMMARY OF THE INVENTION

In the receiver in accordance with the principles of the invention, utilizing a coherent side-lobe canceller (CSLC), the auxiliary antenna is selected with an odd pattern symmetry such as a difference pattern to provide a substantial reduction of the clutter return on the auxiliary channel and to cause the clutter signals on the auxiliary channel to be decorrelated with the clutter received on the main channel. By reducing the clutter on the auxiliary channel and decorrelating it relative to the main channel, the coherent side-lobe canceller circuit operates with relatively effective cancellation of jamming signals. Also, the system attenuates large target signals received in the auxiliary channel when being received in the main or sum lobe of the main channel to prevent the capture of the coherent side-lobe canceller circuits that would inhibit jamming cancellation and would cause transient noise problems at the termination of the jamming signal.

It is therefore, an object of this invention to provide a radar receiver system that operates reliably to overcome the effect of jamming signals.

It is a further object of this invention to provide a radar receiver operating to cancel jamming signals with a coherent side-lobe canceller that substantially reduces the effects of clutter and of large signals also received in the main lobe.

It is still a further object of this invention to provide a radar receiver system which reduces considerably the degradation is CSLC operation caused by clutter on the auxiliary channel.

It is another object of this invention to provide an improved radar receiver system that overcomes the undesired effect of large signals such as target signals capturing the CSLC loops with the resulting undesired degradation of side-lobe jamming cancellation during the occurrence of the target signal and the undesired generation of transient noise problems at the termination of the target signal.

BRIEF DESCRIPTION OF THE DRAWINGS

The novel features of this invention as well as the invention itself both as to its method of organization and method of operation, will best be understood from the accompanying description taken in connection with the accompanying drawings, in which like reference characters refer to like parts, and in which.

DESCRIPTION OF THE PREFERRED EMBODIMENT

Figure 1:
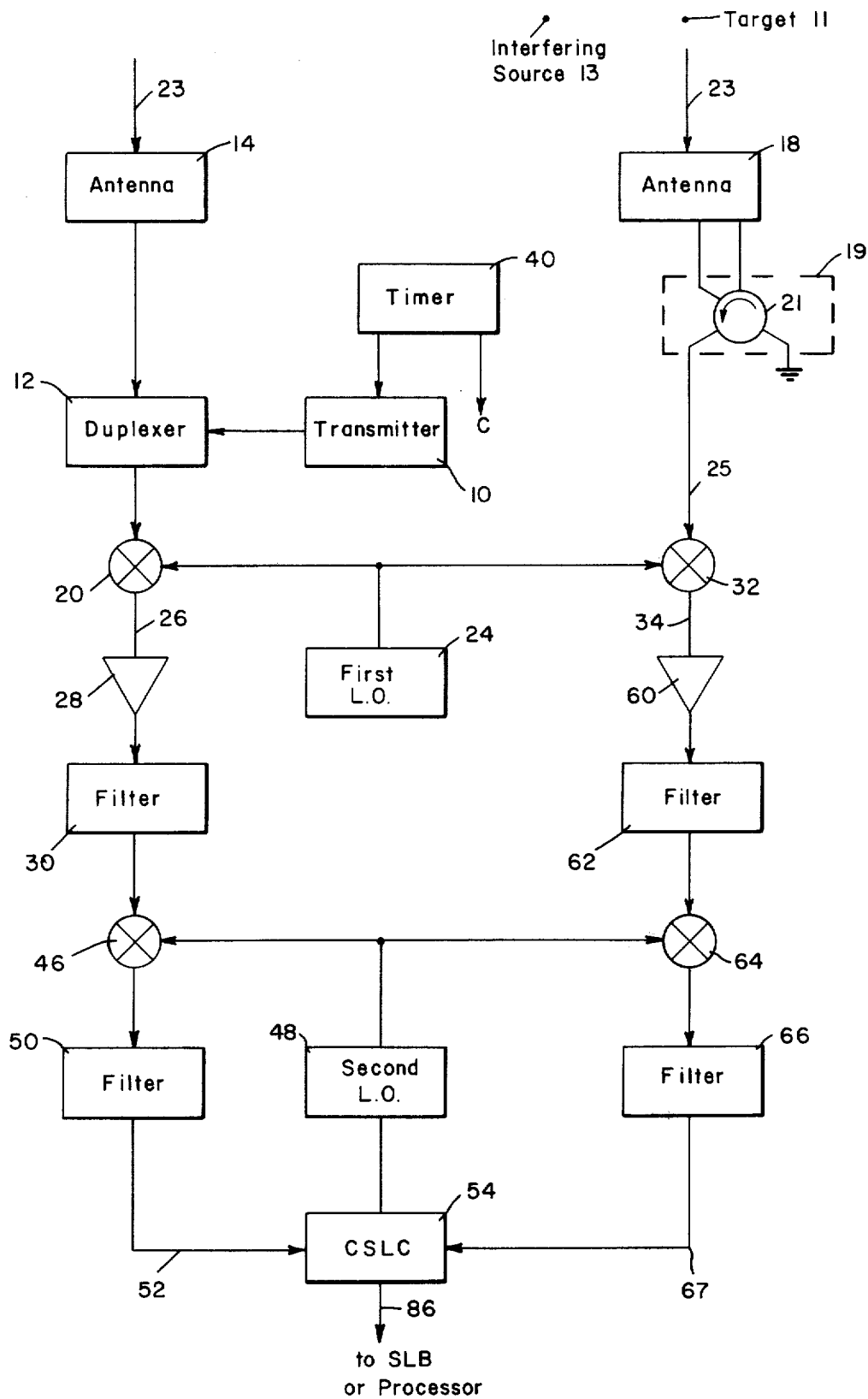
FIG. 1 is a schematic block diagram of the improved radar receiver system in accordance with the principles of the invention.

Referring first to FIG. 1 which shows a radar system in accordance with the principles of the invention operating with a coherent side-lobe cancelling function and overcoming the undesired effects of received clutter and substantially eliminating capture of the coherent side-lobe canceller (CSLC) circuits by large target signals. A transmitter 10 may be provided to transmit pulses of energy through a suitable duplexer 12 and an antenna 14 into space to be reflected from objects and targets such as 11 and to be intercepted by the main antenna 14 as well as by an auxiliary antenna 18. The antenna 14 may be any suitable type such as one having a parabollic dish or an array of antenna elements. The energy intercepted by the antenna 14 which may also be energy from an interfering or jamming source 13 is passed through the duplexer 12 and applied to a conventional first mixer 20 responsive to a local oscillator 24 to apply a radar IF (Intermediate Frequency) signal to a lead 26 and through an amplifier 28 to a filter 30. At the same time, energy may be received both from an interfering source 13 and from the target 11 by an auxaliary antenna 18 and applied through a difference network 19 to a mixer 32 to provide an auxiliary IF signal on a lead 34. The auxiliary antenna 18 and the network 19 provide an odd pattern symmetry with a null on the transmission axis and with the characteristic 180° phase reversal at the null axis. Any suitable difference network may respond to the intercepted signal such as a difference network 21 which may provide a circulator receiving data from two azimuth apertures with the sum port grounded and the difference port applying the difference signal to the lead 25. The antenna 18 may, for example, be a monopulse dish type antenna or an array of elements with strips of elements selected on different sides of the antenna reception axis. The interfering source 13 may be any operating radar system or jamming system such as a continuous wave interference generator as is well known in the art. The antennas 14 and 18 may be considered to have the same center axis 23 as both of the axis are parallel and close together. Coherent side-lobe cancellers may operate primarily to cancel continuous jamming such as may be provided by noise jamming or continuous wave (CW) jamming. A timer 40 controls the timing of the transmission pulses and may provide clock (C) pulses to define the range bins during each pulse repetition interval. The IF radar signal on the main channel is applied from the filter 30 to a second mixer 46 responsive to a second local oscillator 48 to develop a second IF signal which is applied from the mixer 46 through a suitable filter 50 to a lead 52 and in turn to a coherent side-lobe canceller (CSLC) circuit 54. The signal on the lead 34 in the auxiliary channel is applied through an amplifier 60 and a filter 62 to a mixer 64 also controlled by the second local oscillator 48 with a second IF signal being passed through a filter 66 and through a lead 67 to the coherent side-lobe canceller signal 54. It is to be noted that the principles of the invention are not to be limited to any particular type of radar system but are applicable to any radar system requiring or utilizing coherent side-lobe cancellation.

Figure 2:
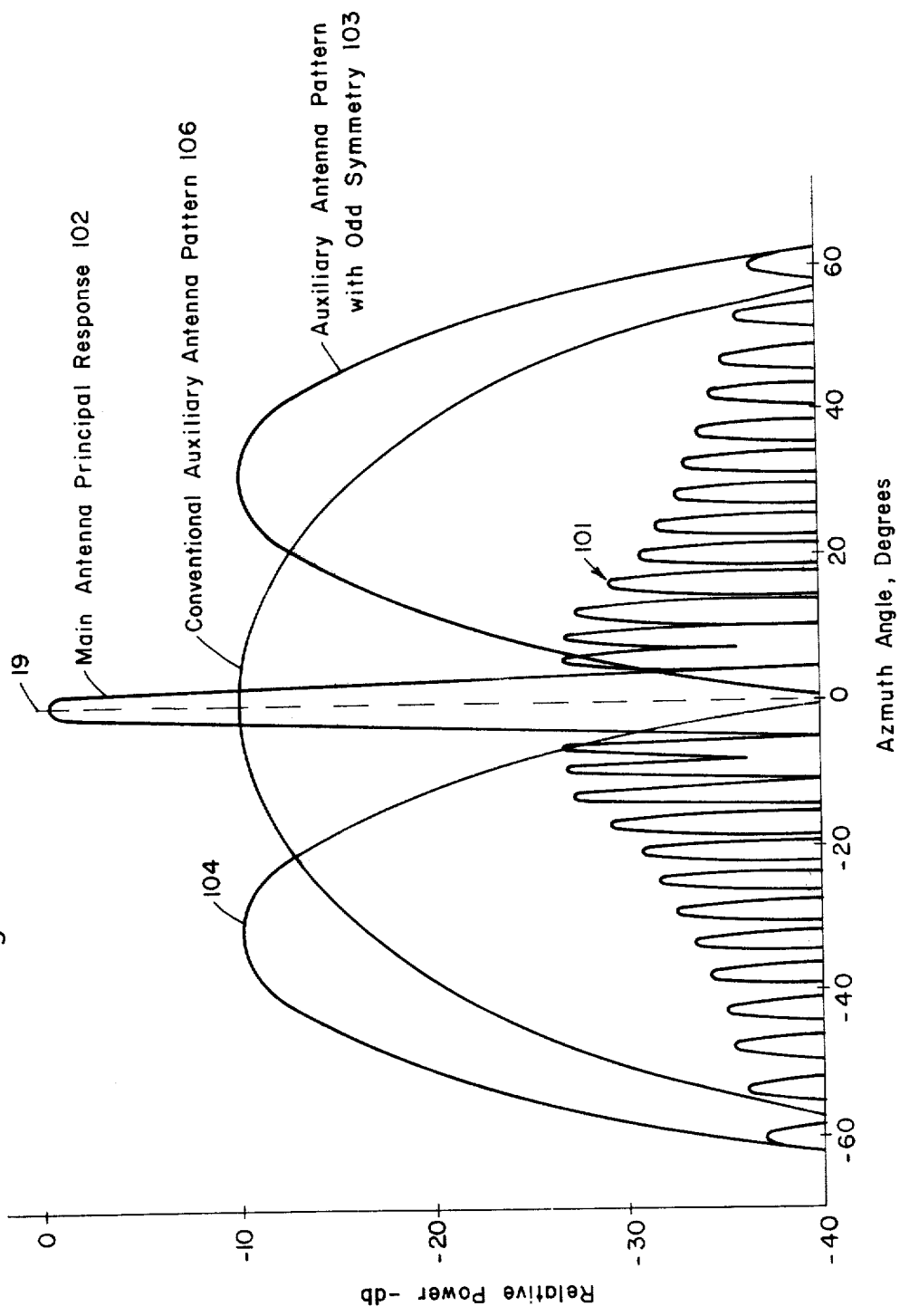
FIG. 2 is a schematic diagram showing the main and auxiliary antenna patterns of relative power in db versus azimuth angle for explaining the improved cancellation system in accordance with the invention.

Referring now also to FIG. 2, the side-lobes 101 of the main radar antenna 14 have an amplitude substantially lower than the main lobe 102 and the gain between that of the auxiliary antenna 18 and the side-lobe gain of the main antanna 14 may be, for example, selected to be approximately 6db at the peaks away from the null of the auxiliary antenna. The auxiliary antenna pattern 103 and 104 resulting from the difference network has an odd symmetry with a phase reversal on opposite sides of the axis 19. Thus, energy from the interfering source 13 has a gain in the auxiliary antenna greater than the side-lobe gain in the main antenna 14 except in the region of the null axis 19. Energy received from the interfering or jamming source 13 in the auxiliary channel is utilized to cancel the jamming energy received in the main channel in the side-lobe positions. Clutter signals are attenuated near the null by the difference pattern 103 and 104 in the auxiliary channel and clutter is decorrelated in the difference channel by being received from randomly opposite sides of the axis 19. Also, energy received from the target along the axis 19 is substantially attenuated by the auxiliary antenna 18 as a result of its null to minimize the large target capture effect of the CSLC loops. The conventional auxiliary antenna pattern is shown by the pattern 106.

Figure 3:
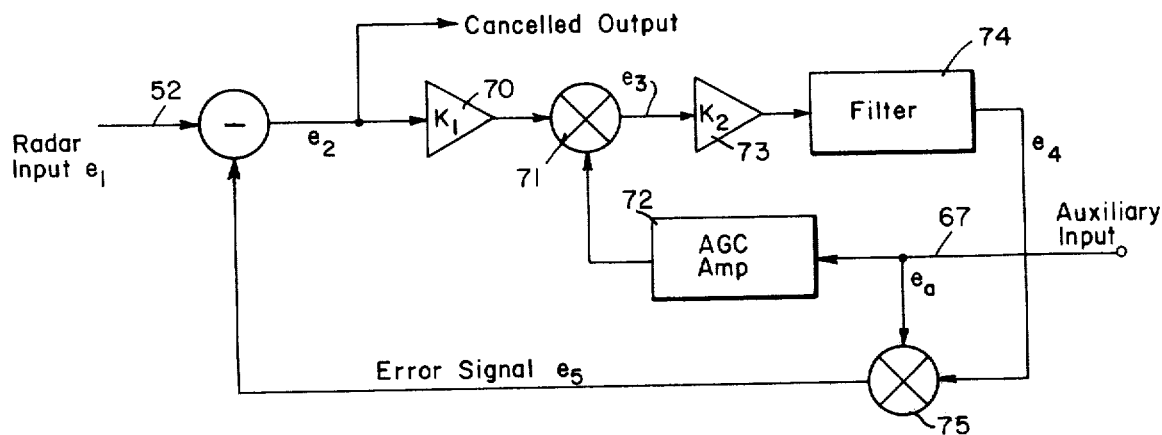
FIG. 3 is a schematic block diagram of an example of a coherent side-lobe canceller circuit to be utilized in the receiver of FIG. 1.

Referring now to FIG. 3 which shows in block diagram form the CLSC circuit 54, the radar signal $e_1$ on the lead 52 has the error signal $e_5$ subtracted from it in a subtractor 69 to produce a cancelled output residue $e_2$ which is applied through the rest of the receiver, which for example may include a side-lobe blanking circuit and a processor in some systems. The residue signal $e_2$ after amplification in an amplifier 70 is also mixed or correlated in a mixer 71 with a limited or constant amplitude version of the auxiliary signal $e_a$ after being applied, through an AGC (Automatic Gain Control) amplifier 72. The output signal $e_3$ after passing through an amplifier 73 is applied through a very narrow band filter 74 (typically a few hundred hertz or less) to provide a filtered signal $e_4$. Wideband signals appearing on the inputs to mixer 71 will have a zero bandwidth output from this correlation mixer if they originate from the same source. The filter output $e_4$ is then used to multiply the auxiliary signal $e_a$ in a multiplier 75 to obtain the error signal $e_5$. As a result of the servo action of the loop, the signal $e_5$ will tend to be in phase and equal in amplitude to that portion of the signal $e_1$ that correlates with it to accomplish cancellation, that is, any signal such as jamming and clutter that is received from a common source. The filter 74 may be represented by the term $$\frac{1}{1 + S/A}$$

where S is the signal bandwidth and A the loop filter bandwidth in radians.

Figure 4:
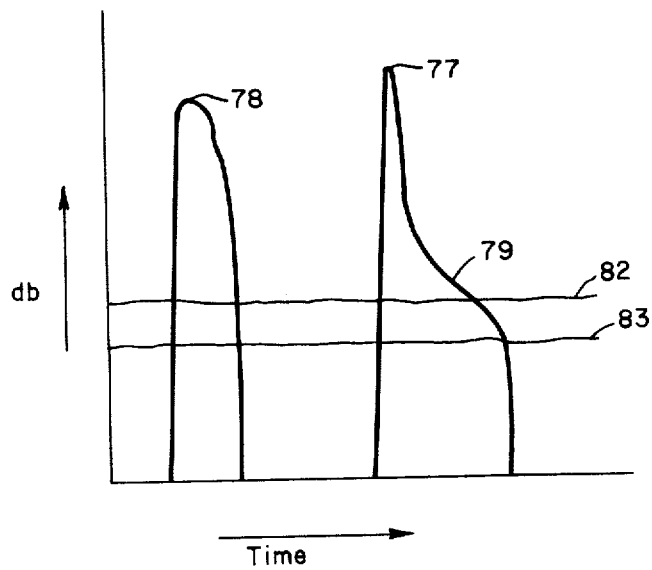
FIG. 4 is a diagram of waveforms of amplitude as a function of time for explaining the operation of the coherent side-lobe canceller.

A large signal appearing in the main antenna beam normally will be correlated with the same signal appearing on the auxiliary CSLC channel if a conventional omni or low gain antenna is utilized on the auxiliary channel. Because these signals are correlated, a large error signal $e_5$ will be developed and the canceller will attempt to cancel the signal in the main beam channel. The signal in the main beam sum channel, which is at least 10db larger than the sum of the same signal in the auxiliary channel, cannot be cancelled because the gain is constrained by the AGC amplifier 72 so that the total error signal sent to the subtractor 69 will always be several db (typically 10db) smaller than the main beam sum signal. These large signals capture the CSLC loops during the large target occurrence intervals, causing a degradation of side-lobe jamming concellation during the large signal period. In addition at the end of the large target signal, the loops will have to reacquire the jamming signals thus causing an additional transient problem. Referring also to FIG. 4 which shows the residue signal amplitude as a function of time provided by the CSLC loops, with a jamming signal 78 being cancelled by the canceller action until a target signal 77 is received in the main and in the auxiliary channels. If the jamming signal is first received at the signal 78, cancellation is delayed for a period provided by the time constant of the loops, and then continues during a period 81 until the large target signal 77 is received in the main lobe, with the large target signal causing the jamming signal to be uncancelled in a conventional system. Also a transient 79 is provided at the termination of the target signal 77 in a conventional system. In the system of the invention the target signal 77 is prevented from controlling the CSLC loops and the jamming signal is cancelled substantially at the termination or fall of the target signal 77 and the transient problem is prevented. The conventional clutter level 82 is lowered to a level such as at 83 in the auxiliary channel, thus allowing greater cancellation of the jamming signals received in the main channel. The antenna characteristics in the auxiliary channel, in accordance with the invention have been found to provide 20db to 30db attenuation of the large target signal in the auxiliary channel.

As clutter has a normal distribution in both range and azimuth dimensions, the difference pattern antenna provides an additional 10db to 20db of decorrelation of the clutter return signals. For example, if the clutter return from the first range bin were to the left of the main beam and the clutter return from the next range bin were to the right of the main beam, these two return signals would alternate in phase compared to the phase of the return signals received by the main antenna. Thus, the substantially even distribution in angle of clutter as a function of range causes a high degree of decorrelation between clutter returns in the main and auxiliary channels. The odd symmetry of the auxiliary antenna with the 180° phase reversal at the null axis provides a decorrelation that minimizes the error signal developed in the CSLC loops allowing the cancellation to operate more effectively on the jamming signals.

Figure 5:
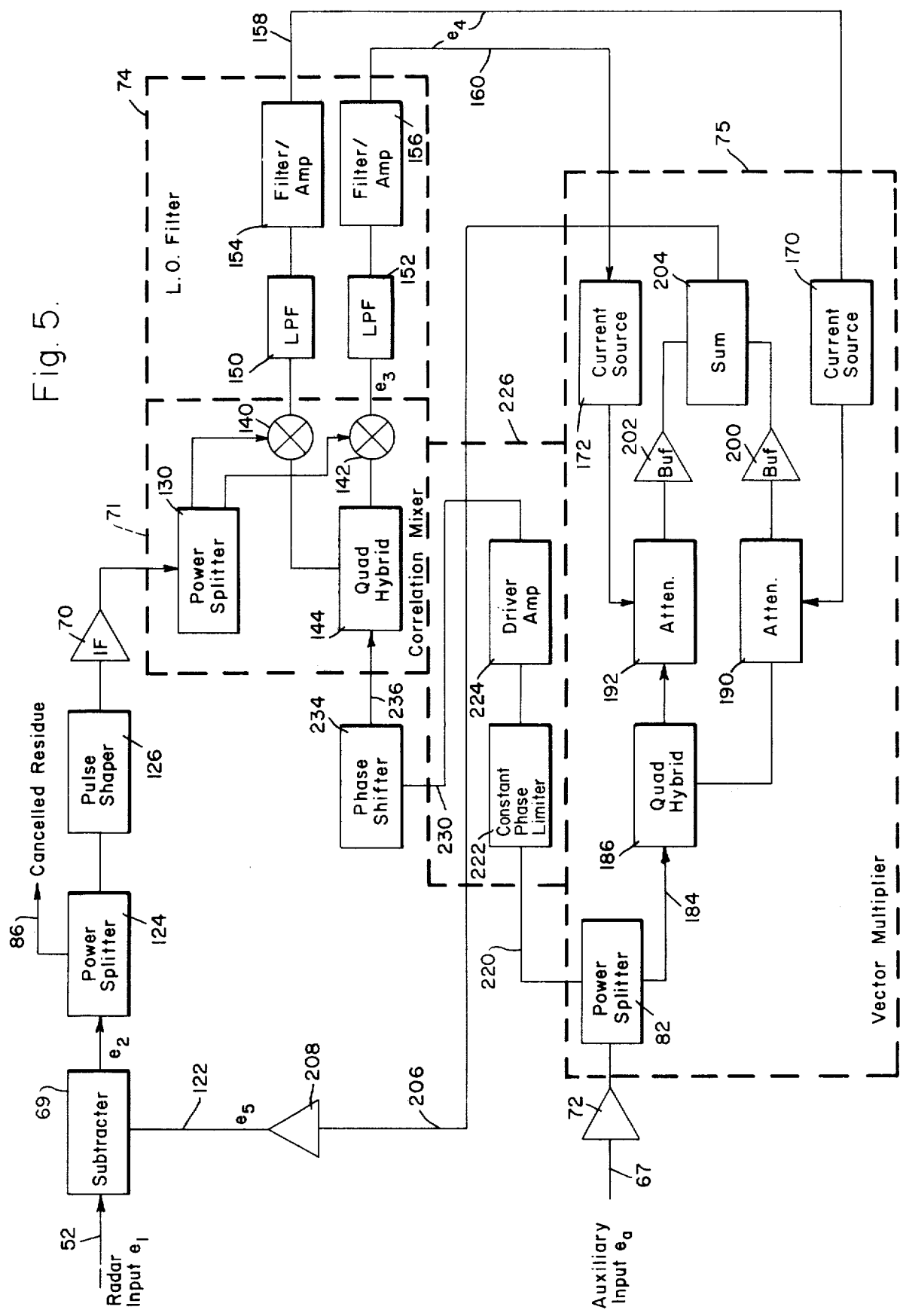
FIG. 5 is a schematic block diagram showing an illustrative example of the coherent side-lobe canceller circuit of FIG. 3 in further detail.

Referring now to FIG. 5 which shows a detailed arrangement of the coherent side-lobe canceller circuit 54 of FIG. 4 operating to a base band frequency, the radar return signal on the lead 52 is applied to the subtractor 69 which also receives a feedback error signal on a lead 122 to apply a difference signal to a power splitter 124, which signal is a cancelled residue and is applied to the output lead 86. The residue signal is also applied from the power splitter 124 through a phase shifter 126 and the IF amplifier 70 to a power splitter 130 of the correlation mixer circuit 71. The signal provided by the power splitter 130 is applied to mixer units 140 and 142 which are controlled by an in-phase and a quadrature signal received from a quadrature hybrid 144. The mixers 140 and 142 provide in-phase I and quadrature Q components of the error signal $e_4$ which are applied through respective low pass filters 150 and 152 and respective filter amplifier circuits 154 and 156 of the filter 74 to respective leads 158 and 160. The filtered signals from leads 158 and 160 are applied to respective current sources 170 and 172 of the vector modulator unit 75. The auxiliary signal on the lead 67 is applied through the AGC amplifier 72 to a power splitter 182 and through a lead 184 to a quadrant hybrid 186 which provides in-phase and 90° out-of-phase signals that are applied to respective attenuators 190 and 192, in turn responsive to respective current sources 170 and 172. The signals provided by the attenuators 190 and 192 are applied through respective buffer units 200 and 202 to a summing circuit 204 which applies a combined and rotated vector signal through a lead 206 and an amplifier 208 to the lead 122 as the feedback or error signal $e_5$ to the second input of the subtractor 120 for providing vector cancellation of the interfering signal on the lead 52.

To control the correlation mixer, the power splitter 82 applies a signal through a lead 220 to a constant phase limiter 222 and a driver amplifier 224 of a constant phase limiter circuit 226 to a lead 230. A trimming phase shifter 234 which may be utilized in some arrangements in accordance with the invention, applies the auxiliary reference signal through a lead 236 to the quadrant hybrid 144 for controlling the correlation mixer operation. The quadrant hybrids 144 and 186 may each be a power splitter that provides 90° phase shift at one output, such as a properly wound transformer.

The principles of the invention are not limited to using a single CSLC circuit by may operate with a plurality of CSLC circuits each having its loop signal on the lead 206 applied to a vector summer with the summed output applied to the subtractor 69. The cancelled output signal out of the amplifier 128 is then applied not only to the power splitter 130 but also to a similar correlation mixer in each of the other CSLC circuits.

The operation of coherent side-lobe cancellers will not be explained in further detail as it is well known in the art such as the description of an intermediate frequency signal canceller in U.S. Pat. No. 3,202,900, "Intermediate Frequency Side Lobe Canceller", invented by P. W. Howells.

Thus, there has been described a radar receiver that overcomes the disadvantages of conventional CSLC arrangements caused by the clutter level on the auxiliary channel limiting the noise cancellation and the large target capture effect of the CSLC loops. The receiver utilizes an antenna system with a difference pattern in azimuth on the auxiliary channel to reduce the clutter return on this channnel and also to cause it to be decorrelated with the clutter received on the main channel. These two effects substantially eliminate the degradation of CSLC operation over most of the surveillance volume. The null of the auxiliary antenna system also minimizes the large target capture effect of large target signals when received in the main lobe of the main channel antenna. The principles of the invention are not limited to receivers utilizing a single CSLC circuit but are also applicable to receivers utilizing a plurality of CSLC loops. the principles of the invention are applicable to other patterns in the main antenna other than the sum pattern and to variations of the auxiliary pattern while providing the cancellation at the null.

What is claimed is:

1. A coherent radar receiver system responsive to target signals and jamming signals comprising:
   main antenna means for receiving energy and having a predetermined lobe pattern along a reception axis;
   auxiliary antenna means for receiving energy and having a pattern with a difference pattern symmetry relative to the reception axis of said main antenna means, said difference antenna pattern being centered at a null axis substantially parallel to the reception axis of said predetermined lobe pattern so clutter signals received from opposite sides of said null axis are decorrelated relative to clutter received by said main antenna means; and
   coherent side lobe canceller means coupled to said main antenna means and to said auxiliary antenna means.

2. The receiver system of claim 1 in which said predetermined lobe pattern is a sum lobe pattern.

3. The receiver system of claim 2 in which said auxiliary antenna means is selected to develop a maximum gain pattern with peaks along the azimuth dimension that are less than the peak of a miximum gain pattern developed by said main antenna means.

4. The receiver system of claim 3 in which said auxiliary antenna means includes an antenna and a difference network coupled thereto.

5. A coherent radar receiver system responsive to target signals, jamming signals and clutter signals comprising:
   a main receiver channel including main antenna means having a relatively narrow sum antenna beam along the antenna axis;
   an auxiliary receiver channel including auxiliary antenna means having an axis substantially parallel and co-incident to the axis of said main antenna means and having a difference pattern substantially symmetrical and having a null on said axis; and
   a coherent side-lobe canceller circuit coupled to said main and to said auxiliary receiver channels to cancel jamming signals.

6. The system of claim 5 in which said auxiliary antenna means includes an antenna and a difference network coupled thereto.

7. The system of claim 5 in which said auxiliary antenna means is selected to develop a maximum gain pattern with peaks along the azimuth dimension that are less than the peak of a maximum gain pattern developed by said main antenna means.

* * * * *